E. V. MORRIS.
TRIMMING DEVICE FOR SCENERY AND THE LIKE.
APPLICATION FILED JAN. 10, 1917.
1,296,422.
Patented Mar. 4, 1919.
2 SHEETS—SHEET 1.
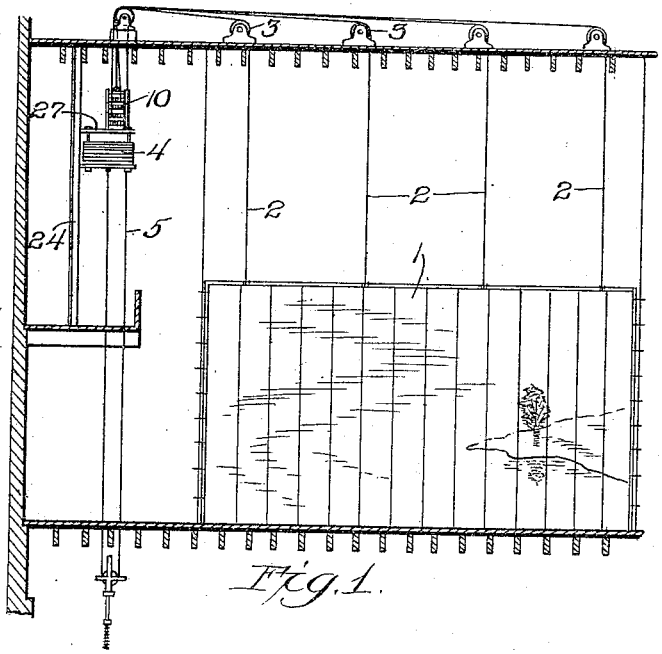
Fig. 1.
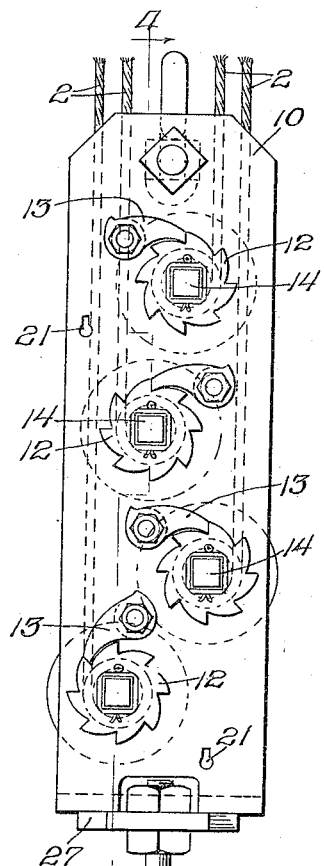
Fig. 2.
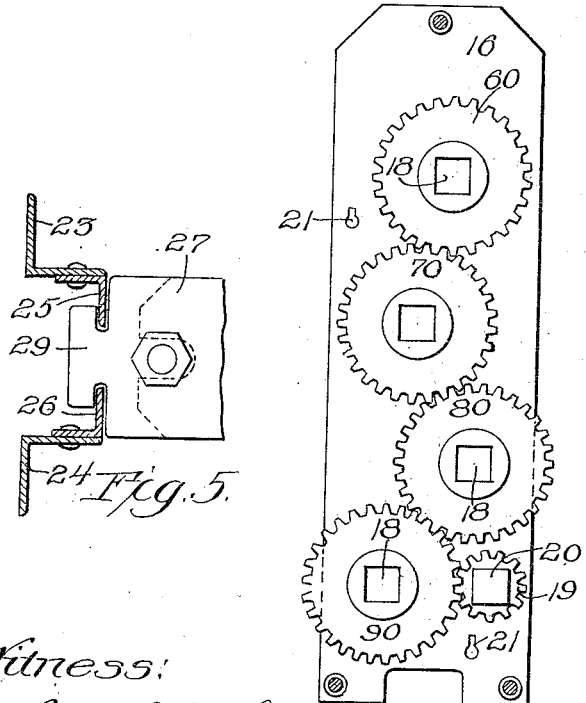
Fig. 5.   Fig. 3.
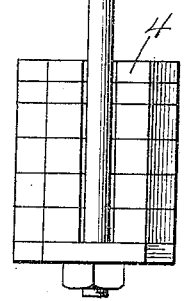
Witness:
Harry S. Gaither
Inventor:
E. V. Morris,
by Chamberlin & Freudenreich,
Atty

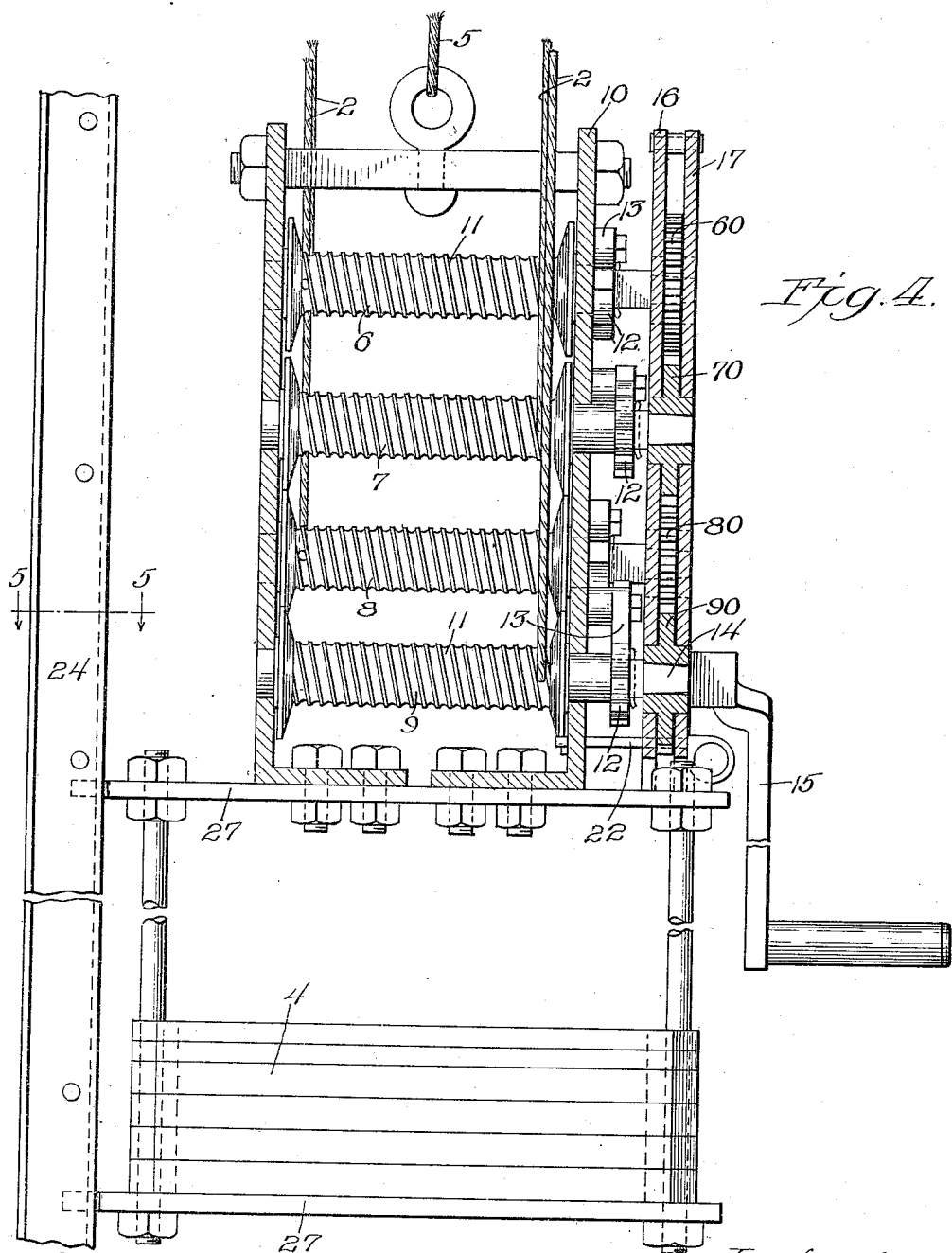

UNITED STATES PATENT OFFICE.

ELZY V. MORRIS, OF CHICAGO, ILLINOIS, ASSIGNOR TO JAMES H. CHANNON MFG. CO., OF CHICAGO, ILLINOIS, A CORPORATION OF ILLINOIS.

TRIMMING DEVICE FOR SCENERY AND THE LIKE.

1,296,422.　　　　　　Specification of Letters Patent.　　　Patented Mar. 4, 1919.

Application filed January 10, 1917. Serial No. 141,526.

*To all whom it may concern:*

Be it known that I, ELZY V. MORRIS, a citizen of the United States, residing at Chicago, county of Cook, State of Illinois, have invented a certain new and useful Improvement in Trimming Devices for Scenery and the like, and declare the following to be a full, clear, and exact description of the same, such as will enable others skilled in the art to which it pertains to make and use the same, reference being had to the accompanying drawings, which form a part of this specification.

My invention has for its object to produce a simple and novel device by means of which a piece of scenery or a curtain may be quickly and easily adjusted to make it hang evenly.

In carrying out my invention I place between the scenery and the usual counterweight a take-up device from which extend cables to various distributed points along the upper edge of the piece of scenery. It sometimes happens that because of a particular location of the fly gallery or for other reasons the counterweight does not have a sufficient range of movement in the vertical direction to afford the requisite movement of the scenery. In such case, by interposing my take-up device between the scenery and the counterweight, the take-up device may be employed to move the scenery independently of the counterweight through a height equal to the difference between the ranges of movement of the scenery and the counterweight.

Therefore, viewed in one of its aspects, my invention may be said to have for its object to produce a simple device which will not only serve the purpose of trimming scenery but will also serve as a hoisting means.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a vertical transverse section taken through the stage of a theater, showing a piece of scenery equipped in accordance with my invention;

Fig. 2 is a side view of the take-up and counterweight, a portion of the latter being broken away, the attachment for connecting the several drums together being omitted;

Fig. 3 is a view looking in the same direction as Fig. 2 of the attachment for connecting the various drums together;

Fig. 4 is a section taken approximately on line 4—4 of Fig. 2, including also the attachment shown in Fig. 3 and a portion of the guiding track for the counterweight; and Fig. 5 is a section taken approximately on line 5—5 of Fig. 4.

Referring to the drawing, 1 represents a piece of scenery which is supported by four cables, 2, passing up to the ceiling of the stage and over suitable pulleys, 3. 4 is a suitable counterweight which may be raised and lowered in the usual way by an endless cable, 5. Instead of attaching the cables 2 or other supporting cables directly to the counterweight, I interpose between the cables 2 and the counterweight a take-up device which will permit any one of the cables to be adjusted independently of the others and all of them to be adjusted simultaneously. The take-up device consists of a plurality of drums, 6, 7, 8 and 9, one for each cable. These drums are mounted in a suitable frame, 10, from which is suspended the counterweight 4. Each of the drums is preferably provided with a spiral thread or groove, 11, which threads or grooves are preferably all right handed or all left handed so as to make the drums interchangeable. The drums are arranged one above the other in a staggered relation so that half of the cables may pass down one side of the device and the other half of the cables down the other side. In the arrangement shown, where there are four cables, two of the cables are attached to corresponding ends of the drums 6 and 8, these cables lying on the same side of the drums; while the other two cables lie on the opposite side of the device and are attached to corresponding ends of the drums 7 and 9. In order to secure a uniform or balanced distribution of the load I prefer to attach half the cables to the corresponding drums at one end of the series of drums and to attach the other cables to the corresponding drums at the opposite end of the series. Then, in turning the drums simultaneously in the proper directions, all of the cables will be wound up evenly without interference with each other, and the cables will follow the spiral grooves in the drums so that the load will always be symmetrically distributed with respect to a vertical plane cutting the drums midway between the ends thereof.

On one end of each of the drums is a ratchet wheel, 12, with which coöperates a pawl, 13, to prevent unwinding of the cables. One of the ends or supporting journals of each drum, or supporting shaft therefor is extended and squared as indicated at 14, for the reception of a suitable handle or crank, 15. It will be seen that by turning the proper drums, one at a time, with the handle or crank, a piece of scenery may be trimmed quickly and easily.

As I have heretofore explained, it is sometimes desirable to raise or lower the scenery bodily without shifting it angularly. In order to provide for this contingency I have made an attachment which will couple all of the drums together so that they may be turned simultaneously. This attachment comprises a pair of plates, 16 and 17, between which lie intermeshing gears, 60, 70, 80 and 90, whose axes occupy exactly the same positions relative to each other as to the axes of the drums 6, 7, 8 and 9. Each of the gear wheels is provided at the center with a socket, 18, adapted to receive one of the squared shafts 14. Meshing with one of the gear wheels, in the arrangement shown the gear wheel 90, is a pinion, 19, having a squared shaft portion, 20, projecting therefrom. The part 20 is similar to the parts 14 so that the handle or wrench may be slipped thereon. The housing for the gear wheels, that is the plates 16 and 17, are provided with openings to permit the passage of the members 14. When it is desired to turn all of the drums simultaneously, the attachment is slipped in place and the handle or crank is placed on the turning member 20.

Any suitable means may be provided for temporarily holding the attachment against displacement. In the arrangement shown, I have provided the housing of the attachment and the adjacent portion of the supporting frame for the drums with registering keyholes, 21, through which keys, 22, may be inserted; the arrangement being such that when the keys are given a partial turn after being inserted, they tie the attachment to the frame 10.

Another feature of my invention has to do with a novel form of guide for the counterweight. This guide consists of two angle irons, 23 and 24, having two of their flanges facing each other and lying parallel with each other, together with two other angle irons, 25 and 26, secured to the members 23 and 24 in such a manner as to produce a Z section. The upper and lower plates, 27, of the counterweight device are each provided at one end with a T-head, 29, which interlocks with the two tracks or guides and prevents lateral displacement of the counterweight in any direction.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In combination, a member to be lifted, a counterweight, a plurality of cables extending from distributed points on said member to said counterweight, a device connected to the counterweight for raising and lowering the same to cause said member to be lowered and raised, and means between each cable and the counterweight for winding up the cable.

2. In combination, a member to be lifted, a counterweight, a plurality of cables extending from distributed points on said member to said counterweight, a device connected to the counterweight for raising and lowering the same to cause said member to be lowered and raised, and means between the cables and the counterweight for winding up the cables individually or in unison.

3. In combination, a member to be lifted, a counterweight, a plurality of cables extending from distributed points on said member to said counterweight, a frame connected to the counterweight, a series of horizontal drums revolubly supported at different elevations in said frame, each of said cables being connected to one of said drums, means for rotating said drums individually or in unison with each other, and a cable connected to said counterweight for raising and lowering the same.

4. A device of the character described comprising a frame, a plurality of drums journaled in the frame, a driving member connected with each of the drums and adapted to receive a crank or handle for turning the same; and an attachment including a series of rotatable socket members geared together, each socket member being adapted to receive one of the aforesaid driving members, together with means for turning said socket members.

5. In a device of the character described, a frame, a series of three or more horizontal drums journaled in said frame one above the other, the axis of each drum being located in a different vertical plane from the axes of the other drums, and each drum having a spiral groove extending around the same from end to end.

6. In a device of the character described, a frame, a series of horizontal drums rotatably supported in the frame, one above the other, the axis of each drum being in a different vertical plane from the axes of the other drums, each drum having an axial extension adapted to receive a wrench for turning the same, an auxiliary frame, a plurality of intermeshing gears supported by the auxiliary frame and having their axes located relatively to each other in the same way as the axes of the drums, each gear having at its axis a socket adapted to receive one of the aforesaid driving members, and means for turning said gears.

7. In a device of the character described, a frame, a series of horizontal drums rotatably supported in the frame one above the other, the axis of each drum being in a different vertical plane from the axes of the other drums, each drum having an axial extension adapted to receive a wrench for turning the same, an auxiliary frame, a plurality of intermeshing gears supported by the auxiliary frame and having their axes located relatively to each other in the same way as the axes of the drums, each gear having at its axis a socket adapted to receive one of the aforesaid driving members, a pinion meshing with said gears, and a driving member similar to the aforesaid driving members connected to said pinion.

8. In a device of the character described, a frame, a series of horizontal drums rotatably supported in the frame one above the other, the axis of each drum being in a different vertical plane from the axes of the other drums, each drum having an axial extension adapted to receive a wrench for turning the same, an auxiliary frame, a plurality of intermshing gears supported by the auxiliary frame and having their axes located relatively to each other in the same way as the axes of the drums, each gear having at its axis a socket adapted to receive one of the aforesaid driving members, means for turning said gears, and means for detachably holding said auxiliary frame to the aforesaid frame.

In testimony whereof, I sign this specification.

ELZY V. MORRIS.

Copies of this patent may be obtained for five cents each, by addressing the "Commissioner of Patents, Washington, D. C."